United States Patent [19]

Mayes

[11] 4,212,726

[45] Jul. 15, 1980

[54] METHOD FOR INCREASING THE PURITY OF HYDROGEN RECYCLE GAS

[75] Inventor: Warden W. Mayes, Big Spring, Tex.

[73] Assignee: Cosden Technology, Inc., Big Spring, Tex.

[21] Appl. No.: 854,378

[22] Filed: Nov. 23, 1977

[51] Int. Cl.$^2$ ................... B01D 47/00; C10G 39/00
[52] U.S. Cl. ............................. 208/101; 55/56; 55/228; 208/65; 208/344; 422/234
[58] Field of Search .............. 208/101, 138, 344, 134, 208/345; 55/220, 228, 56; 422/234

[56] References Cited

U.S. PATENT DOCUMENTS

| | | | |
|---|---|---|---|
| 3,425,931 | 2/1969 | Penisten et al. | 208/101 |
| 3,470,084 | 9/1969 | Scott | 208/101 |
| 3,520,799 | 7/1970 | Forbes | 208/138 |
| 3,706,655 | 12/1972 | Weith | 208/138 |
| 3,882,014 | 5/1975 | Monday et al. | 208/134 |
| 3,923,921 | 12/1975 | Kohfeldt | 208/101 |
| 4,009,097 | 2/1977 | Ward | 208/101 |

*Primary Examiner*—Herbert Levine
*Attorney, Agent, or Firm*—Schwartz, Jeffery, Schwaab, Mack, Blumenthal & Koch

[57] ABSTRACT

Disclosed is a process for hydrotreating hydrocarbon feedstocks and for recovering from the resulting effluent stream selected hydrocarbon fractions, and hydrogen for recycle and other uses with improved purity. Relatively pure hydrogen is provided by separating the effluent stream into a hydrogen-containing gaseous stream and a liquid phase hydrocarbon product, and then contacting the gaseous hydrogen-containing stream in a first absorption step with the liquid phase hydrocarbon product obtained in the gas-liquid separation step, and in a second extraction step with a stabilized portion of the liquid phase hydrocarbon product.

23 Claims, 1 Drawing Figure

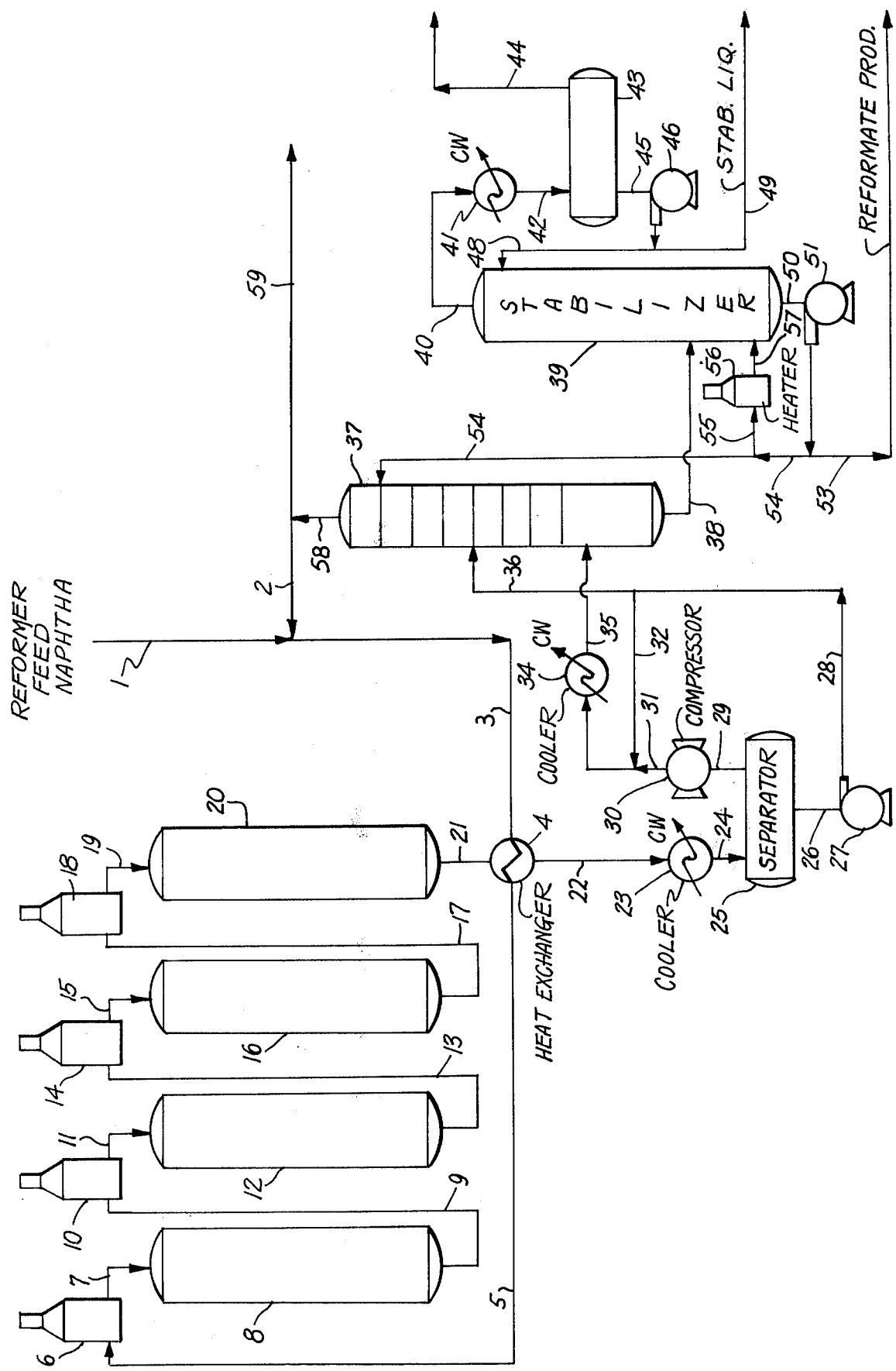

METHOD FOR INCREASING THE PURITY OF HYDROGEN RECYCLE GAS

BACKGROUND OF THE INVENTION

The present invention relates to the hydrotreatment of hydrocarbons. It particularly relates to a method whereby hydrocarbon feed stocks can be hydrotreated in a more economical and facile manner while maintaining a high product quality and quantity. It specifically relates to a method for recovering hydrogen gas from a hydrotreatment process effluent stream for recycle to the process reaction zone or for use in other hydrogen-consuming reactions with a purity which is improved over that obtainable with conventional processes.

It is wel known in the prior art that high quality gasoline boiling range products, such as aromatic hydrocarbons, e.g., benzene, toluene, and xylene, may be produced by the catalytic reforming of naphtha-containing feedstocks, utilizing a platinum-containing catalyst, in the presence of hydrogen to convert at least a portion of the feedstock into aromatic hydrocarbons. One of the predominant reactions in catalytic reforming involves a dehydrogenation of naphthenic hydrocarbons. The dehydrogenation function provides a net excess of hydrogen from the process which is available for other uses, such as hydrodesulfurization reactions, and the like. A considerable portion of the produced hydrogen, however, is required for recycle purposes in order that a proper partial pressure of hydrogen may be maintained over the catalyst in the catalytic reforming zone.

However, the catalytic reforming reaction also involves a hydrocracking function which segments hydrocarbons into relatively low molecular weight hydrocarbons, e.g., normally gaseous hydrocarbons, such as methane, ethane, propane, butane, etc., and in particular, $C_2+$ hydrocarbons which then become contaminants in the gaseous hydrogen which is separated from the effluent of the reaction zone. These contaminants have the effect of lowering the hydrogen purity to such an extent that frequently external purification techniques must be used by those skilled in the art before the net hydrogen from the reformer can be used in other chemical reactions requiring relatively high purity hydrogen. Low hydrogen purity also has a significant effect in the reforming reaction by way of requiring considerable quantities of such low purity hydrogen in order to maintain the hydrogen partial pressure in the reaction zone at the proper level, as previously mentioned.

As those skilled in the art are familiar, the reforming reaction must have a hydrogen atmosphere in order for the various desired reactions to take place. This means that the separated hydrogen gas referred to above must, to a considerable extent, be returned to the catalytic reforming zone. Due to the large pressure drop through a conventional catalytic reforming system, typically comprising a plurality of catalytic reactors and separation vessels, the separated gas for recycle purposes must be compressed to at least the pressure of the reaction zone before it can be returned and properly used. Heretofore, the size of the hydrogen gas compressed has been a significant cost factor in constructing and operating catalytic reforming units for the production of gasoline boiling range products, such as benzene, toluene, and xylene. In other words, the large horsepower requirement for the recycle compressor is a substantial capital investment item and a substantial operating cost item for any catalytic reforming unit.

Moreover, due to current federal environmental regulations, there has been a trend in the catalytic reforming technology towards operating catalytic reforming processes with high severities. With high severity reforming operations, the problem presented by hydrogen purity is decreased by the increased hydrocracking function which accompanies high severity reforming conditions. This increased hydrocracking activity generates significant increases in the concentration of low molecular weight hydrocarbons. These high concentrations of low molecular weight hydrocarbons cause the hydrogen recycle gas purity to decrease and consequently increase the quantities of recycle gas necessary to maintain the hydrogen partial pressure in the reaction zone at the desired level. Increased quantities of the recycle gas must therefore be compressed. Accordingly, with high severity reforming operations, the problem of low hydrogen gas purity is rendered even more acute. It would be desirable, therefore, to provide a method for hydrotreating hydrocarbon feedstocks whereby relatively high purity hydrogen may be produced, not only for recycle purposes but also for other uses outside the hydrotreating reaction.

Heretofore, several attempts have been made to develop a method for purifying the make hydrogen present in a hydrotreating process effluent stream. Typically, this result has been attempted by removing from the hydrotreating process effluent stream a relatively impure hydrogen-containing gaseous stream, compressing this gaseous stream, admixing it with a liquid hydrocarbon stream to absorb therefrom some of the gaseous hydrocarbons, and then removing therefrom in a second separation an enriched hydrogen-containing gaseous stream. For example, in U.S. Pat. No. 3,431,195, a catalytic zone effluent stream is separated in a low pressure gas-liquid separation into an impure hydrogen-containing gaseous stream and a normally liquid hydrocarbon stream. The hydrogen-containing gaseous stream is then compressed and admixed with the liquid hydrocarbon stream from the low pressure separation in order to remove therefrom some of the gaseous hydrocarbons. This admixture is then subjected to a high pressure separation, producing an enriched hydrogen-containing gas for recycle to the catalytic reforming zone. Similarly, in U.S. Pat. No. 3,706,655, an impure hydrogen-containing gaseous stream is removed from the reforming zone effluent stream in a low pressure separation, compressed, admixed with the reformer hydrocarbon feedstock, and then subjected to a high pressure separation wherein a gaseous stream of increased hydrogen content is produced.

In a variation of the above described prior art processes, U.S. Pat. No. 3,520,799 describes a hydrogen purification process wherein a portion of the hydrogen-containing gaseous stream recovered in the high pressure separation is passed into an absorber column wherein it is countercurrently contacted with a $C_6+$ bottoms material from the reforming system stabilizer column whereby further gaseous hydrocarbons are removed from the hydrogen-containing gas stream. The resultant higher purity hydrogen stream is then cooled, and subjected to an additional gas-liquid separation to produce a net hydrogen product for use in other refinery units. However, while this method produces a net hydrogen product of increased purity, the hydrogen gas recycled to the catalytic reforming zone is not subjected to these additional purification steps. Consequently, the hydrogen-containing gas stream recycled to the catalytic reforming zone contains substantial quantities of gaseous hydrocarbons which increase operating costs, particularly in high severity reforming operations. Moreover, in order to obtain the net hydrogen product of improved purity, the method of U.S. Pat. No. 3,520,799 requires subjecting the catalytic reforming zone effluent stream to a complex series of purification steps involving three gas-liquid separations, a gas-liquid absorption, and a fractionation, necessitating a substantial equipment capital investment.

In another variation of the method for purifying make hydrogen described in U.S. Pat. No. 3,431,195 and No. 3,706,655, U.S. Pat. No. 3,882,014 describes a hydrogen enrichment method wherein instead of a high pressure gas-liquid separation, the relatively impure hydrogen gas-containing gaseous stream recovered from the low pressure gas-liquid separator is countercurrently contacted in a contacting-condensation column with a descending stream of cooled fractionation zone liquid bottoms material. This contact produces partial condensation and selective absorption of the upwardly flowing gaseous stream, with a concomitant hydrogen enrichment. However, while substitution of this contacting-condensation step for the high pressure gas-liquid separation of the aforementioned patents produces a hydrogen recycle gas with increased purity, this method does not effect sufficient reduction in the low molecular weight hydrocarbons present in the hydrogen-containing gas stream to allow satisfactory use in a high severity reforming operation.

In view of the current necessity for reforming operations to operate at higher and higher severities, the complexity of the above prior art processes and/or the low purity of the hydrogen recycle gas obtained therefrom renders their use undesirable. Accordingly, there is a great need in the art for a method for hydrotreating hydrocarbon feedstocks whereby make hydrogen can be purified in an economical and facile manner, and which achieves a significant reduction in the concentration of low molecular weight hydrocarbons present in the hydrogen recycle gas.

SUMMARY OF THE INVENTION

Accordingly, it is an object of the present invention to provide an improved method for the conversion of hydrocarbons and the recovery of high quality products from the resulting conversion product.

It is an additional object of the instant invention to provide a method for hydrotreating hydrocarbon feedstocks to produce low molecular weight hydrocarbon products, high purity hydrogen, and normally liquid hydrocarbon products.

It is another object of the present invention to provide an improved process for the catalytic reforming of hydrocarbons to produce a relatively high purity hydrogen product stream, a low molecular weight hydrocarbon product stream, and a normally liquid hydrocarbon product stream.

It is a particular object of the present invention to provide a method for recovering hydrogen gas of increased purity from the effluent stream of a hydrotreating process.

It is a specific object of the instant invention to provide a method for purifying the make hydrogen produced in a catalytic reforming operation.

Yet another object of the present invention is to provide a method for purifying make hydrogen which is suitable for use with a high-severity catalytic reforming operation.

In accomplishing the foregoing and other objects, there has been provided in accordance with the present invention a method for hydrotreating a hydrocarbon feedstock which achieves a significant reduction in operating costs, and which enables the production of a relatively high purity hydrogen product, low molecular weight hydrocarbon products, and normally liquid hydrocarbon products in a facile and economical manner. This method comprises the steps of contacting the hydrocarbon feedstock with a hydrotreating process catalyst in the presence of hydrogen under conditions sufficient to produce an effluent stream containing hydrogen in admixture with converted hydrocarbons; separating the resultant effluent stream into a gaseous hydrogen-containing stream and a liquid phase hydrocarbon stream; compressing the gaseous stream, contacting the compressed gaseous stream with a first absorber liquid comprising at least a portion of the liquid hydrocarbon stream recovered in the gas-liquid separation step and with a second absorber liquid hereinafter specified under conditions sufficient to produce a first product stream of relatively pure hydrogen and a liquid hydrocarbon stream rich in absorbed hydrocarbons; passing the rich liquid hydrocarbon stream into a stabilizer under conditions sufficient to remove a gaseous hydrocarbon overhead stream therefrom and to produce a second product stream of stabilized converted hydrocarbons; returning at least a portion of the stabilized converted hydrocarbon product to the absorption step as the specified second absorber liquid; and returning at least a portion of the hydrogen gas product to the hydrocarbon conversion step. In a further embodiment, the present invention also contemplates cooling the light hydrocarbon overhead stream and separating the resultant cooled stream into a relatively pure stabilizer gas stream and a stabilizer liquid stream.

Broadly, applicant has found that the operating cost attendant hydrotreating processes, and particularly high severity catalytic reforming processes may be significantly reduced by minimizing the concentration of the low molecular weight hydrocarbons in the hydrogen recycle gas. The essence of the instant invention thus resides in a facile and economical method for purifying make hydrogen for recycle and other uses by compressing the make hydrogen and then contacting the compressed make hydrogen stream in a first absorption step with a first absorber liquid comprising at least a portion of the liquid phase hydrocarbon product obtained by the gas-liquid separation of the hydrotreating process effluent stream, and in a second absorption step, with a second absorber liquid comprising a stabilized portion of the liquid phase hydrocarbon product under conditions sufficient to produce a relatively pure hydrogen product stream. In contrast to the above discussed prior art processes, therefore, applicant envisions the solvent absorption of the relatively impure make hydrogen gas with two different liquid hydrocarbon solvents, accruing thereby a significant increase in hydrogen gas purity.

In a further embodiment of the instant invention, applicant also provides an apparatus for recovering high-purity hydrogen gas from a hydrotreatment process effluent stream suitable for use in the hydrotreating process of the instant invention. This apparatus comprises a gas-liquid separator for separating said stream into a hydrogen-containing stream and a liquid hydrocarbon stream; means for supplying the effluent stream to the separator; means for compressing the hydrogen-containing gaseous stream; purifying means for purifying the gaseous hydrogen-containing stream by countercurrent contact with two absorber liquids; means for supplying the gaseous stream to the purifying means; means for supplying at least a portion of the liquid hydrocarbon stream from the separator to the purifying means as a first absorber liquid; and, means for supplying at least a portion of the stabilized liquid hydrocarbon product of the hydrotreatment process to the purifying means as a second absorber liquid. Preferably, the purifying means comprises an absorber column having an inlet at the lower portion thereof for the impure hydrogen gaseous stream, and inlets for each of the absorber liquids at a top portion of the column. Alternatively, the purifying means may comprise two absorber columns, a first absorber column establishing a countercurrent absorption with the impure hydrogen gas stream and the first absorber liquid, and a second absorber liquid establishing a countercurrent absorption with the enriched gaseous hydrogen stream produced in the first absorber column and the second absorber liquid.

Through the use of the process and apparatus according to the instant invention, hydrocarbon feedstocks may be hydrotreated, and particularly catalytically reformed, in a highly facile and economic manner with a significant reduction in operating costs and capital investment. Moreover, by subjecting the impure make hydrogen gas to an absorption step with two different liquid hydrocarbon solvents, a hydrogen gas product is obtained which contains a minimum amount of normally gaseous hydrocarbons. Accordingly, the present invention provides a particularly efficacious method and apparatus for the hydrotreating of hydrocarbon feedstocks and particularly for purifying the make hydrogen produced in such processes.

Other objects, features, and advantages of the instant invention will become apparent to the skilled artisan upon examination of the following detailed description of the present invention, taken in conjunction with the accompanying FIGURE of drawing.

BRIEF DESCRIPTION OF THE DRAWING

The accompanying FIGURE of drawing is a schematic flow diagram of one embodiment of the hydrotreating process and apparatus according to the instant invention, applied to a catalytic reforming operation.

DETAILED DESCRIPTION OF THE PREFERRED EMBODIMENTS

The method of the present invention is applicable to any hydrocarbon conversion process wherein a hydrocarbon charge stock and hydrogen are contacted in a catalytic reaction zone. By way of illustration, but not of limitation, typical processes in which the method of the present invention is applicable include catalytic reforming, isomerization, hydrorefining, hydrocracking, hydrodealkylation, dehydrogenation, and other reactions such as would be well known to those skilled in the art. The present invention is particularly suited, however, for use with a catalytic reforming process, and is particularly advantageous for use with a high severity catalytic reforming process.

The broad art of hydrotreating of hydrocarbons is well known to those skilled in the art, and the particular reaction conditions required for each hydrotreating reaction are also well known. The hydrocarbon feedstocks and catalyst compositions utilized in these hydrotreating reactions are also well known to those skilled in the art and are suitable for use in the hydrotreating process contemplated by the instant invention. For illustrative purposes, the process of the present invention will be described with reference to a catalytic reforming process, since the inventive concept of the instant invention is particularly suitable for application therein, although it is to be clearly understood that the present invention provides a broad method for separating the effluent stream from any type of hydrotreating reaction which produces types of components which are broadly referred to herein as "normally gaseous hydrocarbons" and "normally liquid hydrocarbons" in admixture with hydrogen.

Suitable charge stocks for use in a catalytic reforming operation to produce a gasoline boiling range product, such as reformates containing aromatic hydrocarbons, are those hydrocarbon feedstocks which contain both naphthenes and paraffins in relatively high concentration. Such hydrocarbon feedstocks include narrow boiling range fractions such as naphtha fractions, as well as substantially pure materials such as cyclohexane, methylcyclohexane, methylcyclopentane, and mixtures thereof. The preferred class of feedstocks suitable for catalytic reforming operations include what are commonly known as straight run gasolines such as light and heavy naphtha fractions, with a naphtha fraction, relatively free of normally gaseous hydrocarbons, boiling between about 90° F. and 450° F. being the distinctly preferred feedstock for utilization in the catalytic reforming operation.

The reforming operation is also preferably a catalytic operation, and may be conducted with any suitable catalyst which is effective to convert the non-aromatic material contained in the reformer charge fraction to the corresponding aromatic hydrocarbons. The particular reforming catalyst may be of any of those well known to the art. Typically, these catalysts comprise at least one platinum group metal and an inorganic refractory support. Additionally, the reforming catalyst may be promoted by another metallic component, such as rhenium, to lend stability to the reforming catalyst. Further, the reforming catalyst may also be promoted with a halogen component to increase the acidity thereof. By way of illustration, but not of limitation, typical examples of reforming catalyst suitable for use in the instant invention include platinum-germanium-halogen on alumina catalyst, platinum-halogen or alumina catalyst, platinum-halogen-rhenium on alumina catalyst, and platinum-halogen-rhenium on alumina catalysts, or combinations thereof.

Typical operating conditions for catalytic reforming operations include the presence of the aforementioned reforming catalysts and temperatures from about 800° F. to about 1100° F., preferably from about 800° F. to about 1000° F., pressures from about 50 psig to about 1000 psig, and preferably from about 100 psig to about 200 psig. The reforming zone is also preferably maintained at a liquid hourly space velocity (1 hsv) of 0.1 to 20 or more, and preferably in the range of from about 0.5 to 3 cubic feet of feedstock naphtha per cubic foot of catalyst per hour, and a hydrogen recycle rate in the range of from about 1 to about 20.0 or more moles of hydrogen per mole of feedstock naphtha, and preferably from about 5 to about 7 moles of hydrogen per mole of reformer feedstock naphtha. When a high severity type of reforming operation is desired, the reforming conditions will typically include a temperature in the range of about 900° F. to 1100° F., and preferably about 900° F. to 1050° F.

The catalytic reforming reaction may be effected in any type of reforming system well known to those skilled in the art. For example, the reforming system may be a cyclic system, a semi-cyclic system, or a moving bed system, and may comprise from one to a plurality of catalyst beds. The reforming system may also be either an isothermal or an adiabatic system. Typically, however, the reforming system will comprise a plurality of catalyst beds utilized in either a stacked fashion within a single reactor shell or, more preferably, a series of separate reactor vessels. In the preferred embodiment of the hydrotreating method according to the present invention, the reforming system typically comprises at least three adiabatic reaction zones and preferably four. The particular reforming reactors utilized may be of any suitable construction, and may be such as found in any typical refinery.

The exact amount of catalyst to be utilized in each reactor bed may be of equal volume or varied depending upon the catalyst, feedstock, and the particular purpose for which the hydrocarbon conversion reaction is being carried out. In catalytic reforming, for example, when four separate reactors are utilized, the catalyst may be disposed in separate reactors in the following manner: 10%, 15%, 25%, and 50%, by weight catalyst in each of the reactors, respectively. Other variations, including reactor geometry and catalyst volume, as would be obvious to those skilled in the refining art are also suitable for use therein.

Referring now to the accompanying drawing, a schematic flow diagram of the hydrotreating method according to the present invention is illustrated, applied to a catalytic reforming operation. It should be emphasized, however, that while the hydrotreating method of the instant invention is particularly suitable for use with a catalytic reforming operation, the method contemplated by the present invention is suitable for use in any hydrocarbon conversion process wherein a hydrocarbon charge feedstock and hydrogen are contacted in a catalytic reaction zone.

In the embodiment shown in the accompanying drawing, the reforming system comprises four catalytic reactors 8, 12, 16 and 20. A suitable hydrocarbon feedstock, such as a naphtha fraction and, preferably a $C_6$-400° F. naphtha fraction, is introduced through line 1 and is admixed with a stream of recycled hydrogen gas conducted through line 2. After admixture with the hydrogen recycle stream, the combined naphtha feedstock and hydrogen stream is conducted via line 3, heat exchanger 4, and line 5 to heater 6 and thereafter through line 7 to the reformer reactor 8, wherein it is reformed under conditions suitable for the conversion of the paraffinic and naphthenic components of the feedstock to aromatic hydrocarbons. The partially converted feed stream is then withdrawn through line 9, passed through heater 10, and introduced into the reactor 12 via line 11, wherein it is subjected to further reforming. The further converted mixture of reactants and recycle hydrogen is then removed through line 13, heater 14, and line 15 to the reforming reactor 16. After additional reaction, the further converted mixture of reactants and recycle hydrogen is removed through line 17, heater 18, line 19, to the reforming reactor 20, wherein the reforming reaction is completed. A reaction zone product or effluent stream is withdrawn through line 21 and thermally exchanged against the reformer charge flowing through heat exchanger 4. The partially cooled effluent stream is then passed via line 22 to the cooler 23, and it is thereafter conducted via line 24 into the separator 25.

The separator 25 is essentially a vessel capable of relatively rapid separation of vapors from liquid. This vessel may be of any design well known to those skilled in the art, and typically has an input conduit for the reaction zone effluent located between an upper vaporous outlet conduit and a lower liquid withdrawal conduit. It is also contemplated, that in some instances, this vessel may contain internal heating and/or cooling means depending upon the type of material charged thereto and the degree of separation desired. Generally, the separator 25 is also a relatively low pressure separator, and is maintained at a pressure substantially the same as the reforming reaction zone from which the effluent stream emanates. In a typical reforming operation, the separator 25 will be maintained at a pressure within the range of about 50 psig to about 500 psig.

The separator 25 effects a preliminary separation of the effluent stream into a gaseous stream containing hydrogen in admixture with normally gaseous hydrocarbons, which is removed via line 29, and a normally liquid hydrocarbon stream which is withdrawn through line 26. The hydrogen-containing gaseous stream recovered from the separator 25 is compressed by compressor means 30 to a pressure typically at least 50 psi higher than the pressure of the separator 25, and is removed therefrom via line 31. The compressed gaseous stream is then cooled back to a temperature of about 100° F. in heat exchange means 34 to remove the heat induced by compression of the gaseous stream flowing through line 29. The cooled and compressed gaseous stream is then subjected to a series of treatment steps whereby the normally gaseous hydrocarbons are removed therefrom and a relatively pure hydrogen product stream is obtained.

Applicant has found that a net hydrogen product may be obtained in a facile and economic manner and with a heretofore unobtainable purity by subjecting the cooled and compressed impure hydrogen-containing gaseous stream to two absorptions with specified hydrocarbon absorber liquids. Applicant has found that an absorption purification system for the hydrogen-containing gas stream achieves superior purification of the hydrogen-containing gas than the flash-contact type separations utilized in the prior art. The high affinity of the absorber liquids used herein for the low molecular weight hydrocarbon contaminates in the gaseous stream results in a more complete removal of the gaseous hydrocarbons, and concomitantly enables the attainment of a higher purity net hydrogen stream. The present invention contemplates that the first and second absorptions may be performed in either different or the same vessel. In the accompanying drawing, the use of a single vessel for both absorptions is illustrated. However, it is to be understood that by suitable modification, as would be obvious to those skilled in the art, separate vessels for each absorption step may also be utilized.

In the embodiment shown in the accompanying drawing, the compressed and cooled hydrogen-containing gas stream is introduced through line 35 into the bottom of the absorber column 37. A first solvent or absorber liquid, comprising the liquid phase hydrocarbon stream obtained in the separator 25 is directed through line 26 and a pump 27, which effects an increase in pressure, and through lines 28 and 36 to the intermediate portion of the absorber column 37. The second absorber liquid, hereinafter to be more fully described, is introduced through line 54 into the top portion of the absorber column 37. In the absorber column 37, the upflowing vaporous materials are intimately contacted in a countercurrent fashion with a descending stream of the first absorber liquid. In the absorber column 37, therefore, the relatively impure hydrogen gas stream containing significant amounts of low molecular weight hydrocarbons passes upwardly through plural contacting stages and is scrubbed by the downwardly passing relatively heavy hydrocarbons which comprise the first and second absorber liquids, which have been previously introduced through lines 36 and 54. This absorption operation further purifies the hydrogen gas so that a relatively pure hydrogen stream is withdrawn from the absorber 37 via line 58. A portion of the relatively pure hydrogen product stream is recycled through line 2 into the reforming reaction zone, while the remainder is withdrawn through line 59 for use in other hydrogen-consuming reactions.

The absorber column 37 preferably comprises a vertically positioned and elongated vessel having its longitudinal axis vertically aligned, although any other type of absorber column well known to those skilled in the art may also be utilized. Preferably, the absorber column 37 also contains suitably designed contacting materials such as saddles, helical coils, or suitably designed trays which effect intimate contact of the upflowing gaseous material with the descending absorber liquids. The location of the various input and output streams of the absorber column 37 are such that a vaporous phase is removed from the uppermost portion of the column. At a lower portion of the absorber column, the inlet for the gaseous hydrogen-containing stream is located. Located above the gaseous inlet stream, and below the gaseous outlet stream, are the inlets for the two absorber liquid streams. Satisfactory operating conditions for the absorber column 37 generally include an average temperature of from about 90° F. to about 150° F. Although lower temperatures may advantageously be employed, such lower temperatures result in greater operating costs.

A gaseous hydrocarbon rich liquid phase hydrocarbon stream, comprising the absorbed normally gaseous hydrocarbons, the first liquid phase hydrocarbon stream, and the second absorber liquid is removed as a bottoms through line 38 and conducted to stabilizer column 39. The stabilizer 39 comprises a fractionation column which is maintained under separation conditions suitable to remove a $C_1$-$C_4$ gaseous hydrocarbon fraction from the rich liquid phase hydrocarbon stream, thereby producing a $C_5+$ normally liquid hydrocarbon product. In a catalytic reforming embodiment, the stabilizer 39 is commonly referred to in the art as a debutanizer or a depentanizer, and is generally maintained under overhead and bottoms temperatures of about 180° F. to 200° F., and about 450° F. to 500° F., respectively, in conjunction with an overhead pressure of about 100 to 300 psig.

The $C_5+$ normally liquid hydrocarbon stream, referred to in the art as the stabilized reformate, is withdrawn via line 50 and passed through the pump 51 wherein the flow pressure is increased. A portion of the stabilized reformate product is withdrawn through line 54 for use in the absorber column 37 as the second absorber liquid contemplated by the instant invention. The second absorber liquid thus comprises a stabilized portion of the final liquid hydrocarbon product of the catalytic reforming process. A portion of the stabilized reformate flowing through line 54 is also withdrawn through line 55, and recycled through heater 56 and line 57 into the bottom portion of the stabilizer 39 in order to provide heat thereto. The remainder of the stabilized reformate is removed via line 53 as the final liquid hydrocarbon product of the reforming process.

In the preferred embodiment, the gaseous hydrocarbon stream produced by the stabilizer 39 is condensed and then separated to provide a gaseous off-gas stream comprising methane and ethane, and a liquid $C_3$ and $C_4$ hydrocarbon stream. The gaseous hydrocarbon stream is removed as an overhead from the stabilizer 39 via line 40 and is passed to condensing means 41 to effect a condensation of the $C_3$ and $C_4$ hydrocarbons. The resultant two-phase mixture is removed through line 42 and passed to gas-liquid separator 43 wherein a stabilizer gas stream is removed via line 44, which comprises mainly methane, ethane, and residual hydrogen with some higher molecular weight components being present. This stream is suitable for use as fuel in other parts of the refinery operation but is often processed for recovery of $C_3$ and higher boiling components. A liquid stream comprising $C_3$, $C_4$ and higher boiling hydrocarbons is removed from the separator 43 via line 45 and passed through the pump 46, wherein the flow pressure is increased. A portion of this liquid stream is removed via line 48 and passed as reflux to the upper portion of the stabilizer 39. The remaining portion of the liquid is withdrawn via line 49 and represents the net product stream consisting mainly of $C_3$, $C_4$ and higher boiling hydrocarbons, referred to in the industry as the stabilizer liquid or liquid petroleum gas (LPG).

Moreover, in a preferred embodiment of the instant invention it is also contemplated that a portion of the liquid phase product obtained from the separator 25 may be admixed with the impure hydrogen-containing gaseous stream flowing through line 31 prior to cooling the hydrogen-containing gas stream in exchanger 34 and passing it into the absorber 37. In this embodiment, a portion of the liquid phase hydrocarbon product flowing through line 28 is withdrawn through line 32 and admixed with the gaseous stream flowing in line 31. The combined mixture is then cooled in cooler 34 and introduced into the bottom portion of the absorber 37. The remainder of the liquid phase hydrocarbon product from the separator 25 is then fed through line 36 to its inlet in the absorber column 37, wherein it is then countercurrently contacted with the upflowing gaseous material. By admixing a portion of the liquid phase hydrocarbon product from the separator 25 with the gaseous hydrogen-containing stream, the purity of the net hydrogen gas product can be even further improved. This additional contact of the gaseous stream with a hydrocarbon solvent therefor provides an additional opportunity for the removal of normally gaseous hydrocarbon components from the gaseous stream, since a portion of the heat of absorption is removed before the mixture enters absorber column 37. However, it is also within the scope of the present invention that this additional contact may be omitted.

Through the use of the instant invention, make hydrogen produced by the hydrotreatment of hydrocarbon feedstocks may be obtained with a heretofore unobtainable purity, and in a facile and economical manner. By providing hydrogen gas for recycle and other uses of increased purity, the hydrotreatment method of the instant invention accrues considerable economy in both capital expenses and operating expenses over the typical and conventional prior art scheme. By subjecting the make hydrogen to absorption with the first liquid phase hydrocarbon product and with a portion of the stabilized reformate, a net hydrogen product of improved purity may be obtained. Consequently, a smaller volume of recycle gas need be compressed to maintain the desired reaction partial pressure, accruing a substantial reduction in capital investment costs and operating expenses. Accordingly, the present invention thus provides a particularly efficacious method for the hydrotreatment of hydrocarbon feedstocks, and particularly for the treatment of effluent streams therefrom to produce a net hydrogen gas of outstanding purity.

While the invention has been described in terms of various preferred embodiments, and illustrated by numerous examples, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A method for recovering hydrogen gas of increased purity from a hydrotreatment process effluent stream, containing hydrogen gas in admixture with converted hydrocarbons, consisting essentially of the steps of:
   (a) subjecting said hydrotreatment process effluent stream to a gas-liquid separation under conditions sufficient to produce a gaseous hydrogen-containing stream and a liquid phase hydrocarbon stream;
   (b) compressing the gaseous hydrogen-containing stream to a pressure above that of said gas-liquid separation step;
   (c) admixing the compressed gaseous hydrogen-containing stream with a first portion of the liquid phase hydrocarbon stream obtained in said gas liquid separation and cooling the resulting admixture;
   (d) thereafter countercurrently contacting said compressed gaseous hydrogen-containing stream in a first countercurrent extraction step with a first absorber liquid comprising at least a second portion of the liquid phase hydrocarbon stream recovered in said gas-liquid separation, and in a second countercurrent extraction step with a second absorber liquid under conditions sufficient to produce a first product stream of relatively pure hydrogen;
   (e) subjecting a combined stream of said first and second absorber liquids exiting from said countercurrent contacting steps to distillative stabilization under conditions sufficient to remove a light hydrocarbon overhead stream and to produce a second product stream of heavier stabilized converted hydrocarbons; and
   (f) recycling at least a portion of said second product stream to said second countercurrent extraction step as said second absorber liquid.

2. The method of claim 1, wherein said hydrotreatment process effluent stream is the effluent from a catalytic reforming process.
3. The method of claim 2, wherein said reforming process is a high severity catalytic reforming process.
4. The method of claim 1, wherein said hydrotreatment process effluent stream is the effluent from a hydrocracking process.
5. The method of claim 1, wherein said hydrotreatment process effluent stream is the effluent from a hydrodesulfurization process.
6. The method of claim 1, wherein said hydrotreatment process effluent stream is the effluent from a hydrodealkylation process.
7. The method of claim 1, wherein said gaseous hydrogen-containing stream is contacted with each of said absorber liquids in separate absorber vessels.
8. The method of claim 1, wherein said gaseous hydrogen-containing stream is contacted with each of said absorber liquids in the same absorber vessel.
9. The method of claim 1, further comprising cooling said hydrotreatment process effluent stream before subjecting it to said gas-liquid separation.
10. The method of claim 1, further comprising cooling said compressed gaseous hydrogen-containing stream before contacting it with said absorber liquids.
11. A method for hydroprocessing a hydrocarbon feedstock, comprising the steps of:
   (a) contacting said hydrocarbon feedstock with a hydroprocessing catalyst in the presence of hydrogen under conditions sufficient to produce an effluent stream containing hydrogen in admixture with converted hydrocarbons;
   (b) separating said effluent stream into a gaseous hydrogen-containing stream and a liquid phase hydrocarbon stream;
   (c) compressing said gaseous stream;
   (d) admixing the compressed gaseous hydrogen-containing stream with a first portion of the liquid phase hydrocarbon stream from step (b) and cooling the resulting admixture;
   (e) thereafter contacting said compressed gaseous stream in a first absorption step with a first absorber liquid comprising at least a second portion of the liquid hydrocarbon stream from step (b) and in a second absorption step with a second absorber liquid hereinafter specified under conditions sufficient to produce a first product stream of relatively pure hydrogen and a liquid hydrocarbon stream comprising a combined stream of said first and second absorber liquids rich in absorbed hydrocarbons;
   (f) passing said rich liquid hydrocarbon stream into a stabilizer under conditions sufficient to remove a light hydrocarbon overhead stream therefrom and to produce a second product stream of stabilized converted hydrocarbons;
   (g) returning at least a portion of the stabilized second product stream of step (f) to step (e) as the specified second absorber liquid; and
   (h) returning at least a portion of the hydrogen gas product of step (e) to step (a) as said hydrogen present therein.

12. The method of claim 11, wherein said hydroprocess effluent stream is the effluent from a catalytic reforming process.
13. The method of claim 12, wherein said reforming process is a high severity catalytic reforming process.

14. The method of claim 11, wherein said gaseous hydrogen-containing stream is countercurrently contacted with each of said absorber liquids.

15. The method of claim 14, wherein said gaseous hydrogen-containing stream is contacted with each of said absorber liquids in separate absorber vessels.

16. The method of claim 14, wherein said gaseous hydrogen-containing stream is contacted with each of said absorber liquids in the same absorber vessel.

17. The method of claim 11, further comprising cooling the hydroprocess effluent stream before subjecting it to said gas-liquid separation.

18. The method of claim 11, further comprising cooling said gaseous hydrogen-containing stream before contacting it with said absorber liquids.

19. The method of claim 11, further comprising cooling said light hydrocarbon overhead stream and separating the resultant cooled stream into a relatively pure stabilizer gas stream, and a stabilizer liquid stream.

20. The method of claim 19, further comprising recycling at least a portion of said stabilizer liquid stream back into said stabilizer as reflux.

21. The method of claim 16, wherein said absorber vessel comprises a vertical absorber column and said second absorber liquid is introduced at a point above the point at which said first absorber liquid is introduced.

22. An apparatus for hydroprocessing a hydrocarbon feedstock, comprising:

(a) a reactor for contacting said hydrocarbon feedstock with a hydroprocessing catalyst in the presence of hydrogen under conditions sufficient to produce an effluent stream containing hydrogen in admixture with converted hydrocarbons;

(b) means for separating said effluent stream into a gaseous hydrogen-containing stream and a liquid phase hydrocarbon stream;

(c) a compressor for compressing said gaseous stream;

(d) means for contacting said compressed gaseous stream in a first absorption stage with a first absorber liquid comprising at least a first portion of the liquid hydrocarbon stream from said separating means, and in a second absorption stage with a second absorber liquid under conditions sufficient to produce a first product stream of relatively pure hydrogen and a liquid hydrocarbon stream comprising a combined stream of said first and second absorber liquids rich in absorbed hydrocarbons;

(e) a distillation column for distilling said rich liquid hydrocarbon stream under conditions sufficient to remove a light hydrocarbon overhead stream therefrom and to produce a second product stream of stabilized converted hydrocarbons;

(f) means for passing said rich liquid hydrocarbon stream from said contacting means to said distillation column;

(g) means for returning at least a portion of the stabilized second product stream from said distillation column to said contacting means (d) as the specified second absorber liquid;

(h) means for returning at least a portion of the hydrogen gas product from said contacting means (d) to said reactor as said hydrogen present therein; and (i) means for admixing the compressed gaseous hydrogen-containing stream with a second portion of the liquid phase hydrocarbon stream from said separating means and means, prior to said contacting means (d), for cooling the resulting mixture.

23. An apparatus according to claim 22, wherein said contacting means comprises an absorber column having an inlet for said gaseous stream at a lower portion thereof, inlets for each of said absorber liquids at a top portion thereof, and an outlet for purified hydrogen gas at the top thereof.

* * * * *